UNITED STATES PATENT OFFICE.

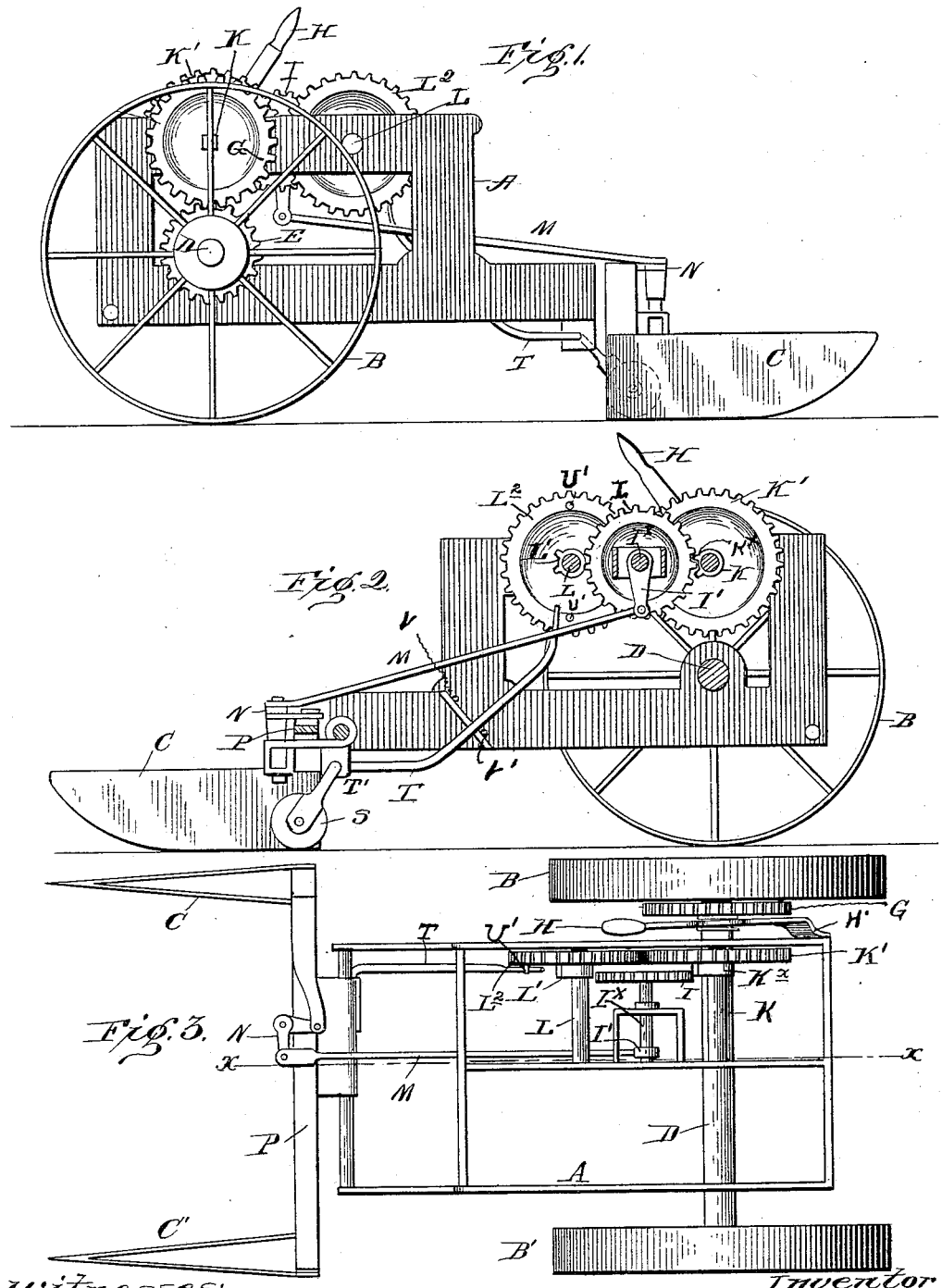

JENS HALAGER HANSEN, OF INDEPENDENCE, IOWA.

CORN-PLANTER.

SPECIFICATION forming part of Letters Patent No. 620,768, dated March 7, 1899.

Application filed April 1, 1898. Serial No. 585,799. (No model.)

*To all whom it may concern:*

Be it known that I, JENS HALAGER HANSEN, a citizen of the United States, residing at Independence, in the county of Buchanan and State of Iowa, have invented certain new and useful Improvements in Corn-Planters; and I do hereby declare the following to be a full, clear, and exact description of the invention, such as will enable others skilled in the art to which it appertains to make and use the same.

This invention relates to an improvement in corn-planters; and it consists of the combination of parts, including their construction and arrangement, substantially as hereinafter more fully disclosed, and specifically pointed out in the claims.

In the accompanying drawings, Figure 1 is a side elevation of my invention. Fig. 2 is a sectional elevation on lines $xx$ of Fig. 3. Fig. 3 is a plan view of the invention.

A is a frame, B B' are wheels therefor, and C C' are the furrow-opener runners. The wheels B B' have their axle D secured to said frame, and wheel B has a concentric cog-wheel E fixed to its hub.

In the frame A is journaled a shaft K, carrying on a squared or angular portion thereof a gear-wheel G, with a corresponding bore fitting said angular portion of said shaft to adapt it to turn therewith.

A shipping-lever H, having a spring plate-like connection H' with the frame A, as shown in Fig. 3, is adapted to permit the shipping of the wheel G. For this purpose the lever H has bearings in a channeled collar on the wheel G, so as to permit the ready movement of said wheel along the shaft K into and out of gear with the wheel E. The shaft K also bears a gear-wheel K', turning with it, and a mutilated gear-wheel or pinion K$^\times$ of two teeth or cogs also turning with said shaft.

A counter-shaft L, supported in the frame A, carries a gear-wheel L$^2$ and a mutilated gear-wheel or pinion L', intergeared with the wheel K' and pinion K$^\times$, respectively. A gear-wheel I, secured to an intermediary shaft I$^\times$, also supported in the frame A, is adapted to alternately or intermittently engage the mutilated pinions K$^\times$ L' at regular intervals. The shaft I$^\times$ has an arm I' depending therefrom, adapted to be correspondingly actuated thereby, and is connected by a pitman M to an arm of a bell-crank lever N, so as to move it on its pivot on the cross-bar between the seed or corn boxes, of the ordinary form. (Not shown.) The other arm of the lever N is connected to a branch of the seedbox dropping-slide P to impart the usual back-and-forth movement thereto to effect the dropping of the seed or corn from the seedboxes, as well understood. This arrangement permits the ready throwing into and out of operation of the dropping-slide, as desired, and provides for the adjustment of the same to bring the hills into line crosswise with those previously formed, as will be readily appreciated.

S indicates a marking-wheel journaled on one arm of a bent lever T, the other arm of which is arranged in the path of and adapted to be moved by projections or the like U' on one of the gears—for instance, L$^2$—so as to lift the wheel S at the points where the seeds are dropped, in order to leave indications for use in dropping the succeeding rows. After having been lifted the wheel S drops and makes a furrow-line to the next drop.

I claim—

1. In a planter, the combination of intermeshing gears operated by the ground-wheel, a gear I, mutilated gears operated by said intermeshing gears and adapted to operate said gear I alternately in opposite directions, a dropping mechanism and connections between said gear I and said dropping mechanism, substantially as described.

2. In a planter, the combination of intermeshing gears operated by a ground-wheel, mutilated gears on the shafts of said intermeshing gears and operated thereby, a gear I between said mutilated gears and adapted to be operated thereby alternately in opposite directions, a rock-arm operated by said gear I, a dropping mechanism, and connections between the same and said rock-arm, substantially as described.

3. In a corn-planter, the combination of the gear-wheel receiving motion from the transporting-wheel axle, the intermeshing gear-wheels, one arranged on the axle of the aforesaid gear-wheel, the mutilated gear-wheels, receiving motion through said intermeshing gear-wheels, an additional gear-wheel adapted to be actuated at different intervals by said mutilated gear-wheels, the dropping mechanism, means for connecting said dropping mechanism to the shaft of said additional gear-wheel, and the marking device suitably hung on the planter-frame and adapted to be engaged by pins of one of said intermeshing gear-wheels, substantially as set forth.

In testimony whereof I affix my signature in presence of witnesses.

JENS HALAGER HANSEN.

Witnesses:
J. E. NIETH,
C. V. LAURITSON,
ANDREN CHRISTENSEN,
W. F. MILLER.